United States Patent [19]

Shenk

[11] 3,731,608
[45] May 8, 1973

[54] REFLEX CAMERA WITH MOTOR DRIVE

[75] Inventor: Edwin K. Shenk, Littleton, Mass.
[73] Assignee: Polaroid Corporation, Cambridge, Mass.
[22] Filed: Apr. 16, 1971
[21] Appl. No.: 134,725

[52] U.S. Cl..........................95/42, 95/DIG. 2, 95/13
[51] Int. Cl..............................................G03b 19/12
[58] Field of Search....................95/42, 13, DIG. 2

[56] References Cited

UNITED STATES PATENTS

3,580,154   5/1971   Ettischer .................................95/42
3,005,394   10/1961   Schulze ................................95/42 X Primary Examiner—Samuel S. Matthews
Assistant Examiner—Michael D. Harris
Attorney—Brown and Mikulka, Gerald L. Smith and William D. Roberson

[57] ABSTRACT

A single lens reflex camera having an electric motor which is energized twice during a photographic cycle. The first energization of the motor occurs for a short interval and functions to release a reflex operator assembly to convert the camera from a viewing to an exposure mode. A subsequent energization of the motor returns the operator assembly to its initial cocked position while simultaneously powering the rolls of a film processing system.

40 Claims, 8 Drawing Figures

REFLEX CAMERA WITH MOTOR DRIVE

BACKGROUND

Highly automated photographic cameras which are controlled in accordance with a somewhat involved operational program have been proposed for introduction to the amateur photographic market. This operational program causes components of the camera to cycle through a sequence of several configurations for each actuation exposing a photographic film unit. In one preferred camera design, a reflex viewing arrangement is utilized in conjunction with automatic exposure control and a motorized system for processing film units immediately following an exposure. Such a combination of features not only provides a highly reliable exposure controlling and film processing performance, but also uniquely permits a camera incorporating all of these features to be folded into a compact form easily carried in the pocket of a garment.

Prior to actuation by an operator, this automated camera normally assumes a viewing mode configuration in which its exposure plane is isolated from scene illumination by a movable operator or mirror and viewing surface assembly. In this viewing configuration, the operator assembly serves the function of providing a surface upon which a scene, in reflex fashion, may be framed and focused in preparation for an exposure. In accordance with a modified single lens reflex optical operation, actuation of the camera causes its components to assume an orientation securing its exposure chamber by closing the shutter through an electromagnetic drive system. When this chamber is secured, the camera is caused to commence an exposure mode operation in which the earlier described operator assembly is released for movement under spring drive to uncover the exposure plane and provide a revised reflex optical path for subsequent exposure of the previously imaged scene. When conversion to the exposure mode of operation is completed, the automatic exposure control components of the camera cycle through a controlled exposure interval, following which the shutter again closes to secure the exposure chamber. An operational mode change then ensues in which the operator assembly is motor driven into its viewing mode configuration and the exposed photosensitive film unit is automatically removed from its position at the exposure plane and processed through a motor driven processing assembly.

When the operator assembly has been cocked or returned to its orientation covering the exposure plane, the shutter again opens to its maximum extent and the camera is ready for the next succeeding photographic cycle. A more detailed description of automatic cameras having such programmed photographic cycles is provided in a copending United States application for patent by E. H. Land, entitled "Reflex Camera," filed Apr. 14, 1970, Ser. No. 28,567 now U.S. Pat. No. 3,672,281, assigned in common herewith.

The above-detailed cataloguing of operational events occurring throughout the photographic cycle illustrates the need within such cameras for somewhat involved electronic logic systems operable in conjunction with electromechanical interface components, for instance, solenoid drives, motors and switching. To achieve needed reliability as well as to maintain reasonably low manufacturing costs, it is desirable that the interface components be minimized in number and simplified to an extent possible. Examination of the sequence of the events or stages during a photographic cycle reveals that one of these electromechanical functions is required to initiate conversion from a viewing operational mode to an exposure mode. This mode conversion is carried out by releasing the spring loaded operator-mirror assembly. A program control system is required to regulate this release inasmuch as it is carried out within the cycle following an initial closing of the shutter to secure the exposure chamber of the camera.

The program control system is additionally called upon to return the operator assembly to its initial station following an exposure interval. This mechanical activity must be carried out while again securing the exposure chamber of the camera by closing its shutter. Upon the return of the operator assembly to its initial viewing mode position, the program control system should react to reopen the shutter in preparation for the initiation of a subsequent photographic cycle.

SUMMARY

The present invention is addressed to a single lens reflex camera utilizing an operator assembly to convert from a viewing mode to an exposure mode in response to a preliminary energization of an electrically powered motor. This motor is energized at a subsequent stage in a photographic cycle to return the operator assembly to its viewing mode orientation. Through the dual energization of the motor, the number of electromechanical interface components otherwise needed to complete a photographic cycle is reduced.

In operation, the operator assembly is retained in its cocked or spring loaded viewing mode orientation as a result of its restraining connection with a camming component of a gear train associated with an electrically powered motor within the camera. Following an initial closure of the shutter blades of the camera during a photographic cycle, this motor is energized only briefly so as to permit its associated camming component to move sufficiently to permit its release from restraining association with the operator assembly. As a consequence of this release, the operator assembly moves under a spring drive into the orientation appropriate for an exposure mode configuration of the camera. Following an exposure interval, the motor is again energized for a sufficient interval to cause the operator assembly to be moved against its spring bias into its initial or cocked position. The camera components are then ready for a viewing mode operation when the shutter assumes its normally open status. During both movements of the operator assembly, the program control system of the camera is operative to retain the shutter thereof in a closed position securing photosensitive material, therein from unwanted exposure.

Another feature and object of the invention is to provide a unique releasing control technique for a spring loaded operator unit which functions within the optical system of a single lens reflex camera designed for use with film of a variety structured to directly record a positive image of a photographic subject. To image properly through a lens system upon such film units, it is necessary that one or an odd number of specularly reflecting surfaces be incorporated with the optical path extending from the camera lens to the exposure plane of the camera. In an important embodiment of the present invention, this specular reflecting surface is provided by a mirror which is carried by the above described operator assembly. Where such cameras are fully automated so as to incorporate an electrical drive motor to supply power required for automatic film processing, the present invention allows improved efficiency by permitting the electric motor to supply two operational functions. Particularly where such cameras are designed for ease of carrying and compactness, the assumption of these dual functions by the motor eliminates a need for an operator assembly release operated from a solenoid or the like, thereby contributing to design simplification and compactness.

Another object and feature of the invention is to provide a single lens reflex photographic camera incorporating an electric motor energizable to provide, inter alia, a drive output for a film processing subsystem; an operator assembly movable from a cocked to a terminal position to convert the camera from a viewing mode to an exposure mode; an exposure control system; a program control circuit for causing first and second energizations of the electric motor during a photographic cycle of the camera; and a mechanical control assembly coupled in driven relationship between the electric motor drive output and being responsive to the first energization of the motor to cause the operator assembly to release from movement from its cocked position into its terminal position and responsive to the second energization of the motor to cause the operator assembly to return to its cocked position from its terminal position to restore the camera to its viewing mode.

Other objects of the invention will in part be obvious and will in part appear hereinafter.

The invention accordingly comprises the apparatus possessing the construction, combination of elements and arrangements of parts which are exemplified in the following detailed disclosure.

For a fuller understanding of the nature and objects of the invention, reference should be had to the following detailed description taken in connection with the accompanying drawings.

DETAILED DESCRIPTION

An important embodiment of the present invention concerns an automatic reflex camera which may be folded into a compact carrying configuration. This camera is designed having an optical path which is altered as the camera is operationally converted between viewing and exposure operational modes. The camera further features motorized processing of individual film units following their exposure accompanied by a resetting of the camera to a normal or standby viewing mode.

Figure 1:
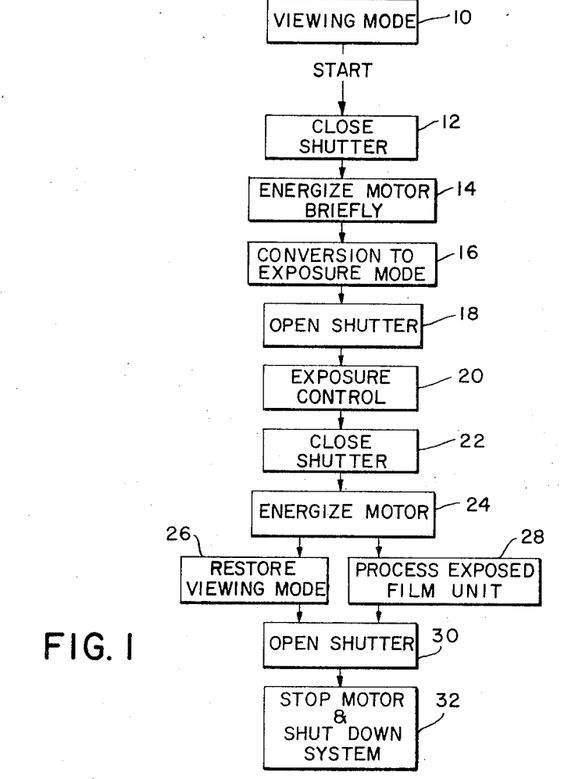
FIG. 1 is a block diagrammatic chart showing the sequence of operations performed by the control systems of photographic cameras with which the features of the invention may be used.

Referring to FIG. 1, the sequence of control operations required for such programmed performance of the camera is illustrated in block diagrammatic form. Block 10 indicates a normal or standby status of the camera prior to an exposure. Identified as a "viewing mode," when the camera is in the status at 10, its operator may frame as well as focus a scene to be photographed at a viewing plane supported upon one side of an internally disposed operator assembly. Following framing and focusing of the scene, the camera operator commences a photographic cycle as indicated functionally by the word "START," this operation being performed by depressing a start button to close a switch. With the depression of the start button, the exposure chamber of the camera is secured by causing the energization of a solenoid which, in turn, urges a shutter assembly into a closed position. This function is indicated by the block 12. When the exposure chamber is secured as indicated at block 12, the camera is converted to its exposure mode configuration by releasing the internal operator assembly for movement under spring bias into a position providing an optical path reorientation. In accordance with the present invention, the operator assembly is released for this motion by causing the electric motor of the camera to be energized only briefly. This function is indicated at block 14. As the operator assembly reaches a terminal position, the photographic cycle enters an exposure mode as indicated at block 16. The camera is now ready to commence a photographic exposure and an exposure interval is started with the reopening of the shutter as indicated at block 18. Automatic control of exposure ensues as indicated at block 20 until a signal is generated causing the exposure interval to terminate by energizing the above noted solenoid to reclose the shutter. This closure of the shutter is indicated at block 22. While the shutter is held closed, the light-tight integrity of the exposure chamber is again secured and the camera commences to automatically reconvert into its viewing mode orientation. The latter conversion is accomplished by the re-energization of the electric motor as indicated at function block 24. When so re-energized, the motor causes the operator assembly to be restored to its initial viewing mode orientation as indicated at block 26 and, additionally, may be used to drive a film processing assembly as indicated at block 28. Following restoration of the camera viewing mode as at 26, the photographic cycle causes the shutter to reopen as indicated at block 30. When the shutter is reopened as at 30, the control system stops motor energization and shuts itself down in preparation for the next photographic cycle. This cycle termination is indicated at block 32. Note that the camera has reassumed the initial standby or normal viewing mode originally described in conjunction with function block 10.

As may be evidenced from the above outline of a preferred photographic cycle and as will become more apparent in the discussion to follow, the simplification of components, for instance by the use of one element for dual purposes, contributes significantly to the practicality of incorporating complex control programs within popularly priced cameras.

Figure 2:
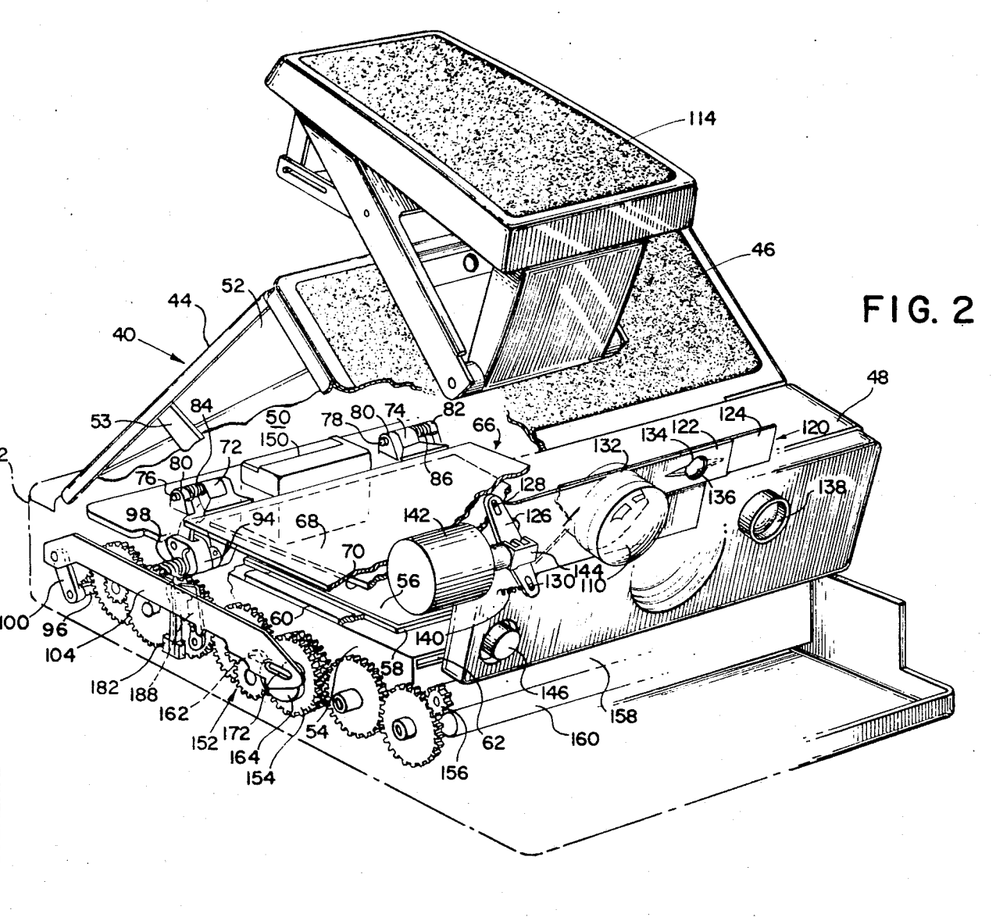
FIG. 2 is a pictorial representation of a single lens reflex camera according to the invention with portions broken away to reveal internal structure.

Turning to FIG. 2, a photographic camera of a foldable single lens reflex variety which operates in accordance with the above described program during a photographic cycle is illustrated generally at 40. Camera 40 is structured having a rectangularly shaped base or housing 42 which pivotally supports a combination of components erectable therefrom into the orientation shown in preparation for camera operation. In general, these housing components include a rear wall 44 having one end hinged to base 42 and an opposite end hinged to a forward wall 46. Forward wall 46, in turn, is pivotally connected to the upper rear edge of an exposure control housing 48. Housing 48 is coupled with base 42 by a pivotal connection made along its rearwardly facing lower edge. Rear wall 44, forward wall 46, exposure housing 48 and the base structure 42 combine in the erected state illustrated to form an exposure chamber 50, the light-tight integrity of which is provided by a flexible, opaque bellows a fragment of which is shown at 52. Erecting linkages as at 53 hold the above outlined components in properly erected positions. At the bottom of exposure chamber 50, base 42 is configured to support a disposable cassette structure 54. Cassette structure 54 is configured to retain a stacked array of discrete film units, the uppermost one of which is positioned at 56 in coincidence with the exposure plane of the camera. Light access to the uppermost film unit 56 is made through an opening or film frame formed within the cassette as at 58. To position the film cassette 54 properly within the base of housing 42, frame members as at 60 are formed therewithin which communicate with the ridge of the film frame 58 of the cassette 54. Cassette 54 also contains a flat battery power supply in its lowermost portion which communicates with terminals within base 42. Additionally, one peripheral side of the cassette is formed having an egress opening or slot at 62 through which the uppermost film unit 56 may be removed for processing following its exposure.

Figures 3, 4, 6, 7:
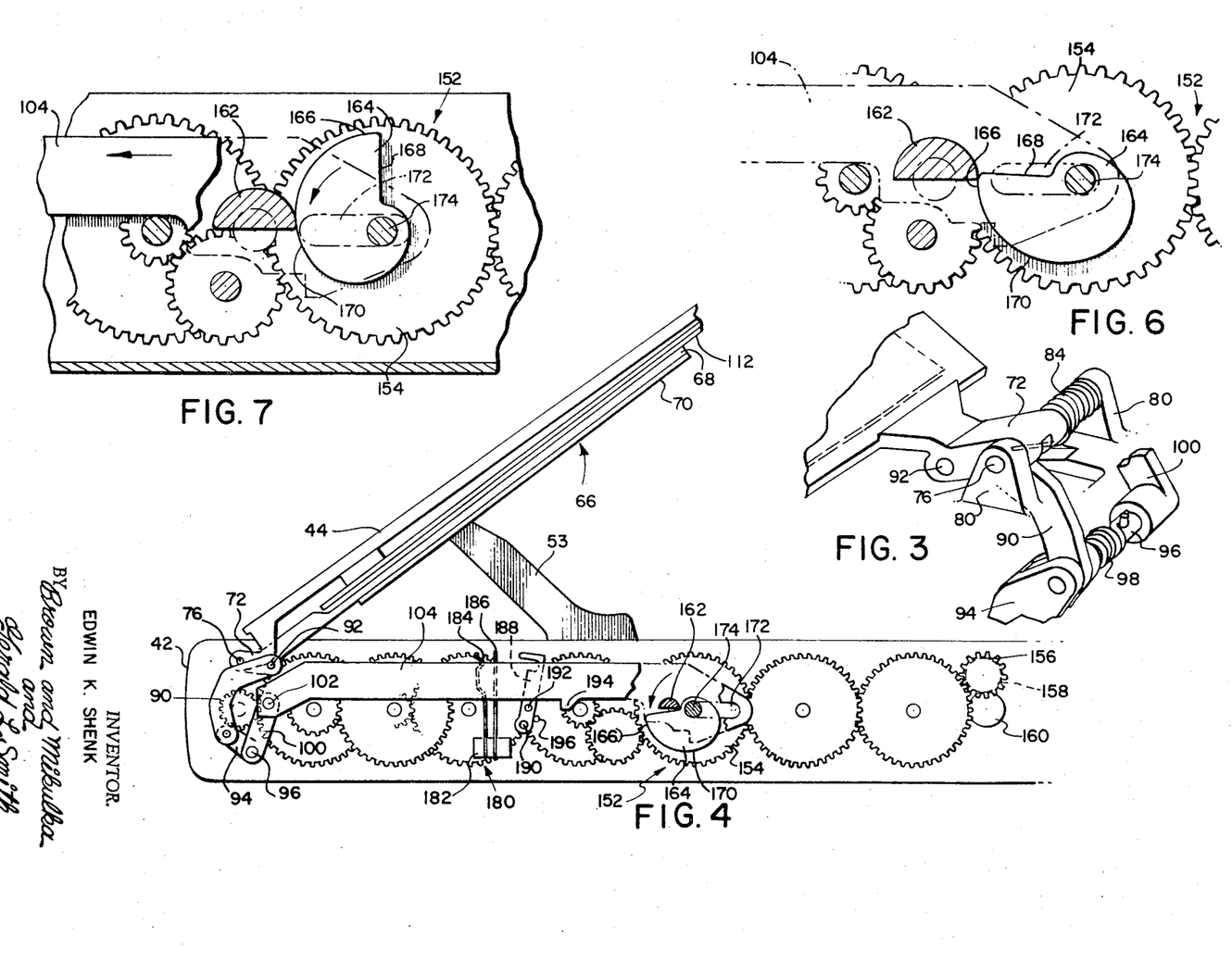
FIG. 3 is a fragmentary view of portions of the control systems of the camera of FIG. 2.
FIG. 4 is a side elevational fragmentary view of portions of the camera of FIG. 2.
FIG. 6 is a fragmentary elevational view of portions of the drive mechanism of the camera showing components in a viewing mode orientation.
FIG. 7 is a side elevational view similar to FIG. 6 and showing the drive mechanism component during a cocking maneuver.
Figure 5:
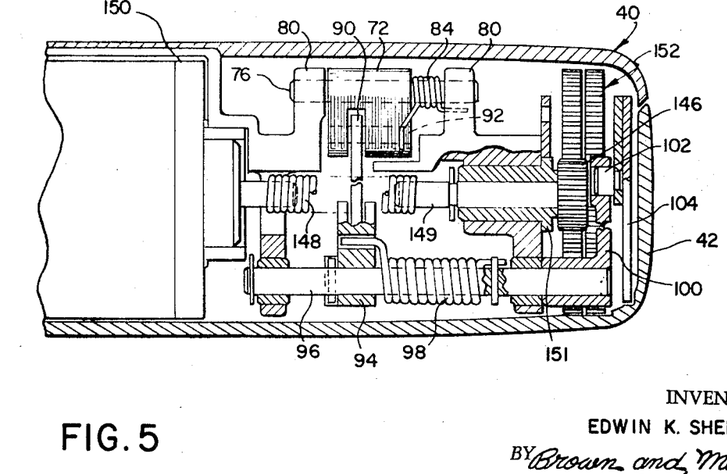
FIG. 5 is a rear fragmentary view of portions of the drive mechanism of the camera.

In the orientation shown in FIG. 2, the components of the camera 40 provide for its operation in a viewing mode as discussed in FIG. 1 in connection with block 10. In this configuration, an operator assembly, shown generally at 66, is retained in its spring loaded or cocked orientation over the film frame 58 blocking the passage of light therethrough. Operator assembly 66 is configured on one side to support a viewing surface 68 which faces into the exposure chamber 50 when in a viewing mode configuration and to support a mirror or similarly specularly reflecting surface 70 on its opposite side. Assembly 66 is coupled to the rear of base 42 through hinge extensions 72 and 74 positioned at either side thereof. Referring additionally to FIGS. 3, 4 and 5 these extensions are seen to be journalled for rotation respectively about shafts 76 and 78. Shafts 76 and 78 are supported respectively from dual extensions 80 and 82 of the frame of support housing 42. Assembly 66 is biased for rotation about its hinge extensions 72 and 74 in an upward direction away from the exposure plane at the film unit 56 by two helical springs 84 and 86. As is more clearly portrayed in FIGS. 3 and 5, each of the springs 84 and 86 has a stationary end abutting a respective frame extension 80 and 82 are a movable end contacting an appropriate hinge extension in biasing relationship.

Operator assembly 66 is restrained in its viewing mode orientation shown as a result of a pivotal connection of its hinge extension 72 with a drawdown link 90. Pivotal connection between the extension 72 and link 90 is made by a pin 92 journalled through the extension 72 at a position forward of and parallel to shaft 76. Link 90 is, in turn, pivotally coupled to and selectively restrained by a crank 94 which is journalled for rotation about a drive shaft 96 and is coupled in driven relationship with an override spring 98. Spring 98 is driven, in turn, from a crank 100 mounted outwardly from crank 94. The position of crank 100 and, consequently of the operator assembly 66 to which it is connected in driven relationship is controlled by virtue of its connection at pin 102 with a ram 104. The operation of ram 104 is described in detail later herein.

During the viewing mode of a photographic cycle, the camera establishes an optical path extending from a taking or objective lens 110 mounted in exposure control housing 48 to a mirror or specularly reflecting surface 112 fixed to the inward side of rear wall 44 (FIG. 4), thence to the viewing surface 68 formed upon the upwardly facing portion of operator assembly 66. Viewing surface 68 is configured having a texture and optical design facilitating the focusing of the image of the scene to be photographed. This image may be viewed by the camera operator through an optical entrance assembly illustrated generally at 114. A configuration suited for viewing surface 68 is described and claimed in a co-pending application for U.S. patent, Ser. No. 83,030 filed Oct. 22, 1970, by Nathan Gold, entitled, "Reflective Imaging Apparatus," and assigned in common herewith, while the assembly 54 and its related internal components are described in detail in a co-pending application for U.S. patent by James G. Baker, filed Dec. 12, 1970, entitled, "Reflex Camera & Viewing Device," Ser. No. 98,356, now abandoned and assigned in common herewith.

During a viewing mode of operation, the exposure control system of the camera 40 provides for an open shutter condition with widest available aperture. This is achieved within the control program through the use of a dual bladed shutter shown generally in FIG. 2 at 120. Shutter 120 is structured having two mutually co-acting blades 122 and 124 which reciprocally move by virtue of their coupling with a reciprocating beam 126. Blade 122 is coupled to one end beam 126 at a pin and slot union 128, while blade 124 is coupled through a pin and slot arrangement 130 at an opposite tip of the beam 126. Blades 122 and 124 are formed having selectively tapered aperture openings which combine to define progressively varying apertures as the beam 126 is rotated about its center point. An aperture of maximum dimension is indicated at 132. Blades 122 and 124, respectively, additionally incorporate secondary tapered aperture openings 134 and 136 which mutually co-act to define progressive apertures over a photocell or the like positioned behind the shutter assembly. With such an arrangement an input corresponding both to scene brightness and to the size of the aperture defined at 132 may be supplied to a photosensing control network. A small secondary lens 138 is utilized to direct light through the apertures 134 and 136 into such a photosensing element.

The aperture opening 132 of shutter 120 is normally retained in its fully open condition by virtue of tension exerted by a spring 140 connected between the beam 126 and the exposure control housing 48. Closing motion is imparted to the blades 122 and 124 by depressing an actuator button 146 in housing 98 to initially energize the winding of a solenoid 142, the central plunger 144 of which is attached in eccentric fashion to beam 126. During a photographic cycle, the winding of solenoid 142 is energized to cause the plunger 144 to be drawn inwardly and secure the exposure chamber 50 by rotating beam 26 and causing the aperture 132 to close. At the commencement of an exposure interval, the solenoid 142 is de-energized permitting blades 122 and 124 to move in mutual correspondence under the drive of spring 140 to define a gradually increasing aperture opening at 132. Simultaneously, the subsidiary openings 134 and 136 admit a correspondingly increasing amount of light into the above-noted photosensing network of the camera's control system. When an appropriate amount of light has been admitted for an exposure of a film unit 56, the solenoid 142 is again energized to terminate an exposure by withdrawing plunger 144 to rotate beam 126 against the bias of spring 140. The shutter 120 is held in this closed position pending the conversion of the camera into its viewing mode orientation. Shutter 120 is described and claimed in a co-pending application for United States patent by Vaito K. Eloranta, Ser. No. 68,919 entitled, "Exposure Control System," filed Sept. 2, 1970, and assigned in common herewith.

Conversion of the components of camera 40 from the viewing mode orientation of FIG. 2 into an exposure mode takes place by mechanically releasing the operator assembly 66 from its exposure plane covering orientation as shown in FIG. 2. When so released, operator assembly 66 moves into the orientation shown in FIG. 4. Drive for imparting this motion is provided by helical springs 84 and 86. In accordance with the invention, mechanical release of the assembly 66 is derived from an initial brief or limited energization of an electric drive motor 150 positioned in the rearward portion of base 42.

Providing power for a variety of operational functions within the camera, the output of motor 50 is coupled to the input gear 146 of a multi-component gear train illustrated generally at 152 by a helical spring 148 and shaft 149. Shaft 149 is rotatably mounted in a bushing 151 mounted upon the frame of base 42 (FIG. 5). Described in detail in a co-pending application for United States patent entitled, "Reflex Camera," by Edwin H. Land, Igor Blinow and Vaito K. Eloranta, Ser. No. 134,733 filed of even date herewith and assigned in common herewith, gear train 152 is formed of a series of idler and reduction gears which provide a selective speed reduction motive output at a timing gear 154 and a processing drive at a drive gear 156.

Drive gear 156 is coupled to drive a pair of processing rollers 158 and 160, while timing gear 154 provides a timed drive output for mechanically manipulating operator 66 during a photographic cycle. The latter control of operator assembly 66 is imparted from a mechanical association of gear 154, ram member 104 and crank 100 which is connected, in turn, with drawn-down link 90 (FIGS. 3, 4, and 5). The forward end of ram member 104 supports a cam follower 162 which operates in connection with a cam 164. Cam 164 is fixed for co-rotation with timing gear 154. Referring additionally to FIGS. 4 – 6, the profile of cam 164 is shown to be configured having a high dwell portion 166, a rapid drop-off or sudden return portion 168 and a rising profile portion 170 established therebetween.

When camera 40 is in the viewing mode orientation shown in FIG. 2, ram member 104 is retained in a rearward orientation between crank 100 and cam 164 by virtue of the engagement of its cam follower 162 with the dwell portion 166 of cam 164. This engagement is illustrated in enhanced detail in FIG. 5. When so oriented, the ram member 104 retains crank 100 in its rearward position against the bias ultimately imparted thereto from helical springs 82 and 84. As noted earlier, the rearward orientation of crank 100 also causes draw-down link 90 to retain operator assembly 66 in its downward or viewing mode position. A slight rotation of timing gear 154 causes cam follower 162 to move off the swell portion of cam 164 and across its rapid drop-off portion 168. As depicted in FIG. 4, ram member 104 then slides forwardly under the bias imparted to crank 100 from springs 82 and 84 and permits operator assembly 66 to rise to its terminal position against the back wall 44 of camera 40. Translational reciprocatory movement of the ram member 104 is controlled at its forward end by a slideable coupling between a slot 172 and a pin 174 fixed to and extending from base 42.

The exposure mode orientation of the components of the camera, as partially shown in FIG. 4, provides for a re-oriented optical path. For instance, the path now extends from lens system 110 to the mirror 70 mounted upon the downward facing side of operator assembly 66, thence to the exposure plane at uppermost film unit 56. In this mode orientation, the shutter assembly 120 is opened and then selectively closed to photographically record a scene upon film unit 56.

As outlined in connection with FIG. 1 at function blocks 22 and 24, following an exposure shutter 120 is held closed while motor 150 is energized. As in the earlier energization of the motor 150, gear train 152 is driven to cause a second rotation of timing gear 154 and its associated cam 164. Additionally, processing rollers 158 and 160 are driven from gear 156. Referring additionally to FIG. 7, as this gear train drive is carried out, the rising portion 170 of cam 164 moves into engagement with cam follower 162 to drive the ram 104 rearwardly. Rearward translation of ram 104, in turn, rotates crank 100 rearwardly, thereby pulling draw-down link 90 downwardly. Downward movement of link 90 pivots operator assembly 66 about shafts 76 and 78 until it assumes its viewing mode configuration as shown in FIG. 2. Simultaneously, the uppermost film unit 56 is moved out of cassette structure 54 through slot 62 and zone processed through rollers 158 and 160. Upon completing the operation of restoring operator unit 66 to its viewing mode and upon fully processing the exposed film unit 56 as indicated respectively at 26 and 28 in FIG. 1, solenoid 142 is de-energized to open the shutter 120.

A photographic cycle is completed, as indicated in FIG. 1 at function block 32, upon the de-energization of motor 150 along with the shutting down of the electronic control system components. To provide for mechanical translation of the ram 104 in properly timed correspondence with the operation of the operator assembly 66, timing gear 154 is driven through one revolution for each photographic cycle. As a consequence, the cam 164 returns to its starting position at the end of a photographic cycle.

The reciprocatory motion of the ram 104 during a photographic cycle may be utilized for control purposes by providing a position responsive switch actuating function. In particular, such switching may be used in a cycle phasing manner to provide for initial motor de-energization as well as system shut-down at the end of a photographic cycle.

Returning to FIGS. 2 and 4, an embodiment of such a cycle phase switch is shown generally at 180. Switch 180 is configured having an electrically insulative base 182 which is fixed to an inward side of camera base 42. From switch base 182 there extend two electrically conductive resilient contacts 184 and 186. Switch 180 further includes a mechanical motion amplifier configured as a lever 188 pivotally mounted upon a stud 190 extending from base 42. Lever 188 additionally is configured to support an outwardly extending stud 192 which is positioned for selective contact with a tab 194 formed integrally with and extending downwardly from ram 104. Pivotal movement of lever 188 in a direction toward the front of the camera 40 is limited by a stud 196 fixed to and extending from base 42. Switch 180 is selectively actuated in correspondence with the movement of ram 104. When camera 40 is in a viewing mode configuration, ram 104 is in a position wherein tab 240 contacts stud 192 in a manner holding the lever 188 in a position causing causing contacts 184 and 186 to close a circuit. This orientation is shown in FIG. 2. With the initial energization of motor 150 and consequent release of ram 104 to its forward position, tab 194 is removed from contact with stud 192 to permit lever 188 to pivot forwardly and cause contacts 182 and 184 to assume an open circuit orientation.

The above described switching operation provides for the closing of the contacts 184 and 186 at such time as operator assembly 66 is in its cocked downward or viewing mode position. The contacts are opened simultaneously with the commencement of movement of operator 66 from this viewing mode orientation.

Figure 8:
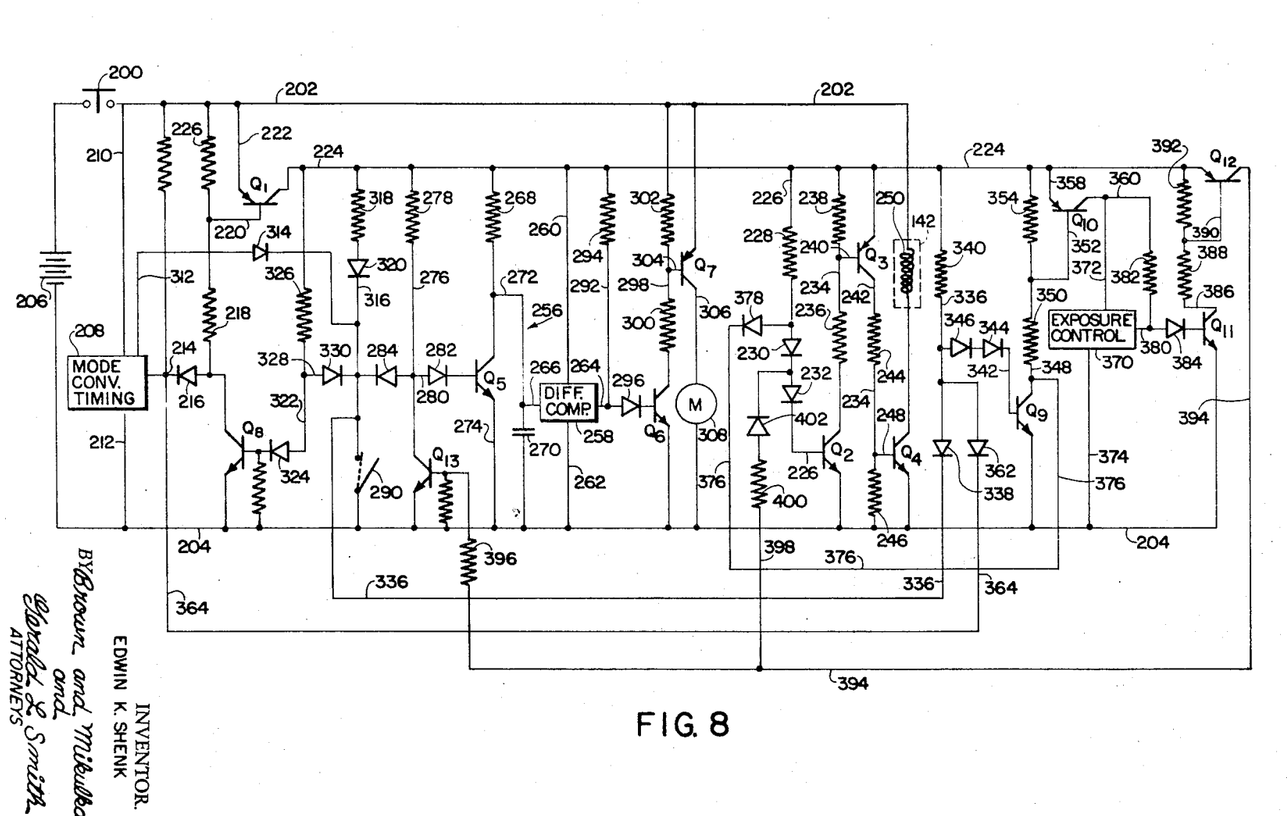
FIG. 8 is a circuit diagram illustrating a control system for use with the camera of FIG. 2.

Referring to FIG. 8, a control circuit for causing the camera 40 to perform in the manner described is depicted. A photographic cycle is commenced with the depression of actuating button 146 to close a switch 200. When closed, switch 200 energizes main power lines 202 and 204 from a battery 206. As noted earlier, it is preferred that battery 206 be included as a component of disposable cassette 54. Energization of lines 202 and 204 initially enables a mode conversion timing function 208 from along lines 210 and 212. Conversion timing function 208 includes an R-C timing network and triggering circuit such as a differential comparator and is activated in conjunction with the movement of operator assembly 66. In this regard, the output 214 of timing function 208 remains at the ground potential of power line 204 until such time as the operator assembly 66 reaches its exposure mode configuration. For purposes of facilitating the description to follow, when the outputs of such triggering systems or comparators are at the ground reference potential of line 204 they are referred to as "low" and when they assume the voltage status of source line 202 they are referred to as being "high."

Output 214 is coupled through a diode 216, bias resistor 218 and line 220 to the base electrode of a PNP transistor $Q_1$. The emitter of transistor $Q_1$ is coupled through line 222 to main power line 202 and its collector is connected with a secondary or logic power line 224. A resistor 226 is coupled between line 220 and power line 202 to prevent accidental turn on of transistor $Q_1$. The low status at output 214 of mode conversion timing function 208 at the commencement of a photographic cycle serves to forward bias the base-emitter junction of transistor $Q_1$, thereby powering logic power line 224 from power line 202.

Energization of logic power line 224 from transistor $Q_1$ serves initially to energize the shutter solenoid 142 by forward biasing the base-emitter junction of an NPN transistor $Q_2$. Forward biasing current is directed to the base of transistor $Q_2$ from line 224 through a line 226, bias resistor 228, diode 230 and diode 232. The emitter of transistor $Q_2$ is coupled to reference power line 204, while its collector is coupled to power line 224 through line 234 including resistors 236 and 238. An "on" status at transistor $Q_2$, in turn, forward biases the base-emitter junction of a PNP transistor $Q_3$, the base of which is connected to line 234 and resistor 236 from line 240. The emitter of transistor $Q_3$ is connected with power line 224 and its collector is connected along a line 242 through resistors 244 and 246 to ground reference line 204. Conduction through line 242, in turn, forward biases the base-emitter junction of an NPN transistor $Q_4$, the base of which is connected to line 234 through line 248. The emitter of transistor $Q_4$ is coupled to ground reference line 204, while its collector is connected through the winding 250 of a shutter actuating solenoid to power line 202. Winding 250 forms a component of the earlier described shutter solenoid 142. Accordingly, solenoid 142 is depicted functionally by a dashed boundary 142 in the instant figure.

The time interval required for solenoid 142 to cause the shutter 120 to close and thereby secure exposure chamber 50 is followed by an R-C timing network 256 comprised of resistor 268 and capacitor 270 operating in conjunction with a differential comparator 258. Differential comparator 258 is coupled to logic power line 224 from along line 260, and to ground reference power line 204 from along line 262. The comparator 258 is of conventional design, operating as a non-inverting amplifier. The output of comparator 258 at line 264 may assume a high or low status in response to the receipt at its input line 266 of a voltage level signal, respectively, above or below a predetermined reference level. This signal is derived from the R-C timing network 256. Input 266 of differential comparator 258 is coupled to line 272 at a point within network 256 intermediate resistor 268 and capacitor 270.

Timing network 256 is designed having a time constant selected to reach the trigger level of differential comparator 258 in a period of time corresponding with the time required to assure that the shutter blades 122 and 124 of the camera 40 have been moved from a fully open position to a fully closed position. During this timing interval, the output of line 264 assumes a low status. Timing operation of the network 256 is permitted as a result of the "off" status of an NPN transistor $Q_5$. The collector of transistor $Q_5$ is coupled to line 272 intermediate resistor 268 and capacitor 270, and its emitter is connected through line 274 to ground reference line 204. Thus connected, transistor $Q_5$ is used to selectively shunt capacitor 270 and reset network 256. To forward bias transistor $Q_5$ and thereby shunt capacitor 280, biasing current is supplied to the base thereof from logic power line 224 through line 276, bias resistor 278, line 280 and diode 282. At the commencement of an exposure interval, however, this current is diverted through diode 284 cross a closed switch 290 to ground reference line 204. Switch 290 is a phase cycle switch corresponding to switch 180. Until operator assembly 66 is released for movement from its cocked position, switch 290 remains closed.

When timing network 256 achieves the threshold or reference voltage of comparator 258 following a period of time adequate to permit solenoid 142 to fully close the shutter blades 122 and 124 of the camera, the output at line 264 goes "high." A "high" output at line 264 terminates a clamping current flow from logic power line 224 into line 292, bias resistor 294 and output line 264 of differential comparator 258. As a result, current now passes through diode 296 to forward bias the base-emitter junction of an NPN transistor $Q_6$. The emitter of transistor $Q_6$ is connected with power reference line 204 and its collector is connected with power line 202 through a line 298 including bias resistors 300 and 302. As current is conducted through transistor $Q_6$, the base-emitter junction of a PNP transistor $Q_7$ is forward biased. The base of transistor $Q_7$ is coupled to line 298 from along line 304, while its emitter is coupled to power line 202. The collector of transistor $Q_7$ is coupled along a line 306 which, in turn, is connected to the terminals of a d.c. motor 308 and with ground reference line 204. Motor 308 corresponds with motor 150 of camera 40. With the forward biasing of transistor $Q_7$, motor 308 is energized and operator assembly 66 is released for movement into its exposure mode orientation. As the operator assembly 66 leaves its cocked orientation, switch 290 is opened to de-energize motor 308 and activate mode conversion timing function 208.

This initial de-energization of motor 308 is carried out by the reassertion of a forward biasing current flow along line 276, through bias resistor 278, line 280 and diode 282 to the base of NPN transistor $Q_5$. With the opening of the phase cycle switch, this forward biasing current is not longer diverted through diode 284 and a contact of switch 290. As a consequence, timing capacitor 270 of timing network 256 is shunted to ground reference line 204 through line 274. With the shunting of capacitor 270, the output of line 264 of differential comparator 258 goes "low" and current at line 292 is diverted from the base of transistor $Q_6$ into the output 264 of differential comparator 258. As a consequence, the forward bias exerted at transistor $Q_6$ is removed and conduction through line 298 is terminated. As a result, the forward bias of transistor $Q_7$ is removed and motor 308 is de-energized. The initial energization of motor 308 is very brief, amounting to the period of time required to cause the opening of switch 290.

Early in a photographic cycle, while switch 290 is closed, the timing operation of mode conversion timing function 208 is restrained by a current diverting clamp including a line 312, diode 314, line 316 and switch 290. Line 316 is connected between logic power line 224 and reference level power line 204 and includes a current limiting resistor 318 and diode 320 as well as switch 290. With the opening of switch 290, line 312 no longer communicates with ground reference line 204 through line 316 and function 208 is permitted to commence timing the period required for operator assembly 66 to move from its cocked viewing mode configuration into its exposure mode configuration.

An opening of switch 290 also permits the forward biasing of the base-emitter junction of an NPN transistor $Q_8$. The base of transistor $Q_8$ is connected with logic power line 224 through a line 322 including diode 324 and a bias resistor 326. Current flow through line 322 is diverted through line 328 and diode 330 into line 316 whenever switch 290 is closed. Accordingly, with the closure of switch 290, transistor $Q_8$ is "off." The emitter of transistor $Q_8$ is coupled to ground reference line 204, while its collector is connected through resistor 218 and line 220 to the base of transistor $Q_1$. A latching arrangement is provided thereby which serves to hold transistor $Q_1$ "on" as long as switch 290 is open.

The opening of switch 290 de-activates another clamping arrangement including line 336 which extends through a diode 338 and bias resistor 340 to logic power line 224. Coupled to line 336 at a point intermediate diode 338 and bias resistor 340 is a line 342 incorporating diodes 344 and 346 and extending to the base of an NPN transistor $Q_9$. The emitter of transistor $Q_9$ is connected to ground reference line 204 and its collector is connected through line 348, bias resistor 350 and line 352 to the base of a PNP transistor $Q_{10}$. A resistor 354 is connected in line 348 between line 352 and logic power line 224 to provide "turn-off" bias at transistor $Q_{10}$. The emitter of transistor $Q_{10}$ is connected to logic power line 224 through line 358 and its collector is connected with an exposure function power line 360.

Transistors $Q_9$ and $Q_{10}$ being thus interconnected, when transistor $Q_9$ is forward biased by current from line 342, through diodes 344 and 346, conduction to ground line 204 will be completed and the base-emitted junction of transistor $Q_{10}$ will also be forward biased. However, when switch 290 is closed, current otherwise forward biasing transistor $Q_9$ is diverted along the clamping arrangement including line 336 and switch 290. When switch 290 is opened, another clamping arrangement including diode 362 and line 364 provides a current diverting path to the output 214 of mode conversion timing function 208 in order to retain transistor $Q_9$ in a reverse bias state while timing function 208 is timing out the period required for operator assembly 66 to reach its exposure mode orientation. During this period, the output at line 214 will be "low" and, as a consequence, clamping line 364 is permitted to provide a diverting function.

When timing function 208 has timed out the movement of operator assembly 66, output line 214 assumes a "high" status, thereby terminating the flow of current through line 364. As a consequence, biasing current is introduced from line 224 through line 336 to forward bias transistor $Q_9$. An "on" status at transistor $Q_9$ promotes a corresponding "on" status at transistor $Q_{10}$ and line 360 is energized from line 224 through line 358. Energization of line 360, in turn, energizes an exposure control function 370. Exposure control 370 is connected with line 360 from along line 372 and with ground reference power line 204 from along line 374.

Conduction across transistor $Q_9$ also activates a current diverting line 376 extending from line 226, through diode 378 and to the collector side of transistor $Q_9$. When activated, line 376 serves to divert biasing current passing through line 226 and bias resistor 228 from the base of transistor $Q_2$. As a result, transistor $Q_2$ is reverse biased into an "off" status simultaneously with the energization of exposure function power line 360. When transistor $Q_2$ is reverse biased, transistors $Q_3$ and $Q_4$ are correspondingly reverse biased. As transistor $Q_4$ is turned "off," winding 250 of solenoid 110 is de-energized to release the elements of camera shutter 90 for movement from a fully closed position toward an open position.

During the ensuing exposure interval, the output at line 380 of exposure control function 370 remains "low" until an exposure detecting function therein reaches the threshold value of a differential comparator also contained therein. When this threshold level is reached, the comparator triggers to rapidly change the output at line 380 to a "high" status. During an exposure interval, when the output at line 380 is "low," current is permitted to pass from line 360 through a bias resistor 382 to communicate with ground level through control function 370 and line 374. When the output at line 380 goes "high" at the termination of an exposure interval, current passes from line 360 through bias resistor 382 and diode 384 to the base of NPN transistor $Q_{11}$. The emitter of transistor $Q_{11}$ is connected to ground reference line 204 and its collector is connected through line 386, bias resistor 388 and line 390 to the base of a PNP transistor $Q_{12}$. A "turn-off" bias resistor 392 is connected between line 390 and power line 224. The emitter of transistor $Q_{12}$ is connected with logic power line 224 and its collector is connected to line 394. Line 394 is connected through a bias resistor 396 to the base of an NPN transistor $Q_{13}$ which functions to reactivate timing network 256. Line 394 additionally is coupled through line 398, bias resistor 400 and diode 402 to line 226 leading, in turn, to the base of transistor $Q_2$.

At the end of an exposure interval, the output of exposure control function 370 at line 380 will assume a "high" status to cause the forward biasing of transistor $Q_{11}$. When forward biased, transistor $Q_{11}$ draws the base-emitter junction of transistor $Q_{12}$ into a forward biased condition. As a consequence, current flows from line 224 through line 394. Line 394, in turn, energizes line 398 to cause a forward biasing of the base-emitter junction of transistor $Q_2$ from along line 226. As noted earlier, when transistor $Q_2$ is forward biased, transistors $Q_3$ and $Q_4$ correspondingly are forward biased to energize the winding 250 of solenoid 142. This energization causes the shutter to reclose and terminate an exposure. When energized, line 394 also forward biases the base-emitter junction of transistor $Q_{13}$. The emitter of transistor $Q_{13}$ is connected to ground reference power line 204 and its collector is connected to line 276. When current from line 396 forward biases transistor $Q_{13}$, current from line 276 is diverted from line 280 and a forward bias at transistor $Q_5$ is removed. As a result, the shunt about timing capacitor 270 is removed and timing network 256 commences to time-out the period required for the elements of the camera shutter 120 to close. The output at line 264 of differential comparator 258 remains "low" until this shutter timing period terminates, at which time the output of the differential comparator 258 at line 264 assumes a "high" state. While the output at line 264 remains "high," the base-emitter junction of transistor $Q_6$ is forward biased from along line 292 and diode 296. When transistor $Q_6$ is forward biased, transistor $Q_7$ is, in turn, forward biased to cause motor 308 to be re-energized from line 306 and power line 202.

As described earlier, continued energization of motor 308 causes operator assembly 66 to return to its viewing mode orientation and provides rotational drive for film processing rollers 158 and 160. As operator assembly 66 reaches its viewing mode or cocked position, switch 290 again is closed. When switch 290 closes, forward biasing current otherwise directed to transistor $Q_8$ is diverted through the switch to power reference level line 204. Transistor $Q_8$ is reverse biased and, in turn, transistor $Q_1$ is reverse biased. The resultant de-energization of logic power line 224 shuts down the entire circuit to terminate a photographic cycle.

From the foregoing it may be noted that the program control system of the invention is operative to initiate and time-out the closure of the shutter 120 both at the commencement of a photographic cycle and at the termination of an exposure interval as well as to hold the shutter in a closed position to secure exposure chamber 50 during operational mode conversions. Further, the program provides a dual energization of the drive motor of the camera, first to cause the release of operator assembly 66 to provide for mode conversion following an initial closure of the shutter then to cock or reconvert to a viewing mode while simultaneously processing film units.

Since certain changes may be made in the above described reflex camera without departing from the scope of the invention herein involved, it is intended that all matter contained in the description thereof or shown in the accompanying drawings shall be interpreted as illustrative and not in a limiting sense.

What is claimed is:

1. A single lens reflex camera comprising in combination:

motor means energizable from a source of electricity to provide a drive output;

control means for causing first and second energizations of said motor means during a photographic cycle of said camera;

operator means movable from cocked to terminal positions to convert said camera from a viewing mode to an exposure mode of operation;

means for controlling the exposure of photosensitive material during said exposure mode of operation; and mechanical control means coupled in driven relationship with said drive output, responsive to the first energization of said motor means to cause said operator means to move from said cocked to said terminal positions thereby converting said camera to said exposure mode and responsive to said second energization to cause said operator means to return to said cocked position from said terminal position, thereby restoring said camera to said viewing mode at the conclusion of a photographic cycle.

2. The single lens reflex camera of claim 1 in which said control means includes means responsive to the movement of said operator means from said cocked position for terminating said first motor means energization.

3. The single lens reflex camera of claim 1 in which said control means includes means responsive to return movement of said operator means into said cocked position for terminating said second motor means energization.

4. The single lens reflex camera of claim 1 in which said control means includes:

means responsive in correspondence with movement of said operator means from said cocked position for terminating said first motor means energization, said means being further responsive in correspondence with the return into said cocked position of said operator means for terminating said second motor means energization.

5. The single lens reflex camera of claim 1 in which said control means includes switch means actuable in correspondence with the movement of said operator means from and into said cocked position respectively for causing the termination of said first and second motor means energizations.

6. The single lens reflex camera of claim 1 in which:

said means for controlling the exposure of photosensitive material includes shutter means movable at the commencement of a said photographic cycle from an initial open position to a closed position blocking the passage of scene light therethrough; and said control means is operative to cause said first motor means energization when said shutter means has moved to said closed position from said initial open position.

7. The single lens reflex camera of claim 6 in which said control means further includes means responding in correspondence to movement of said operator means from said cocked position for terminating said first motor means energization.

8. The single lens reflex camera of claim 1 in which: said means for controlling the exposure of photosensitive material includes shutter means movable from an open position to a closed position to terminate an exposure of said photosensitive material; and said control means is operative to cause said second motor means energization when said shutter means has moved into said exposure terminating closed position.

9. The single lens reflex camera of claim 8 in which said control means further includes means responsive in correspondence with return movement of said operator means from said terminal into said cocked position for terminating said second motor means energization.

10. The single lens reflex camera of claim 1 in which:

said means for controlling the exposure of photosensitive material includes shutter means movable from an initial open position to a closed position blocking the passage of light therethrough, thence to an open position to initiate an exposure of said photosensitive material, thence to said closed position to terminate said exposure; and said control means is operative to cause said first motor means energization when said shutter means has moved from said initial open position to said closed position, is responsive in correspondence with said movement of said operator means from said cocked position for terminating said first motor means energization, and is operative to cause said second motor means energization when said shutter means has moved into said exposure terminating closed position.

11. The single lens reflex camera of claim 10 in which said control means further includes means responsive in correspondence with return movement of said operator means into said cocked position for terminating said second motor means energization.

12. The single lens reflex camera of claim 1 in which:

said means for controlling the exposure of photosensitive material includes shutter means movable between an open position and a closed position blocking the passage of light therethrough; and said control means includes timing means for providing an output signal when said shutter means is in said closed position, and means responsive to said output signal for causing said first and second energizations of said motor means.

13. A single lens reflex camera comprising in combination:

motor means energizable to provide a rotational drive output;

exposure chamber means for supporting photosensitive material at an exposure plane;

shutter means actuable to move between positions unblocking and blocking the passage of scene light to said exposure chamber;

operator means movable from a cocked position blocking the passage of light to said exposure plane into a terminal position to convert said camera from a viewing mode to an exposure mode of operation;

exposure control means for selectively actuating said shutter means to control the exposure of said photosensitive material during said exposure mode of operation;

program control means for regulating the conversion of said camera between said viewing mode and said exposure mode during a photographic cycle; and mechanical control means coupled in driven relationship with said rotational drive output, responsive to a first energization of said motor means to cause said operator means to move from said cocked to said terminal positions thereby converting said camera to said exposure mode and responsive to a second energization to cause said operator means to return to said cocked position from said terminal position, thereby returning said camera to said viewing mode at the conclusion of a photographic cycle.

14. The single lens reflex camera of claim 13 in which said program control means is operative to cause said first and second energizations of said motor means in correspondence with the movement of said shutter means into said position blocking the passage of scene light into said exposure chamber.

15. The single lens reflex camera of claim 13 in which said programmed control means is operative to cause said first and second energization of said motor means in correspondence with the movement of said shutter means into said position blocking the passage of scene light into said exposure chamber and is responsive in correspondence with the movement of said operator means from said cocked position for terminating said first motor means energization.

16. The single lens reflex camera of claim 13 in which said program control means is operative to cause said first and second energizations of said motor means in correspondence with the movement of said shutter means into said position blocking the passage of scene light into said exposure chamber and is responsive in correspondence with return movement of said operator means into said cocked position for terminating said second motor means energization.

17. The single lens reflex camera of claim 13 in which said program control means is operative to initially actuate said shutter means to move from said unblocking to said blocking position for securing said exposure chamber and is operative to cause said first motor means energization when said shutter means initially reaches said position blocking the passage of scene light to said exposure chamber.

18. The single lens reflex camera of claim 17 in which said program control means includes means responsive in correspondence with the movement of said operator means from said cocked position for terminating said first motor means energization.

19. The single lens reflex camera of claim 13 in which:
said exposure control means is operative to actuate said shutter means for movement from said unblocking to said blocking position to terminate a said exposure; and
said program control means is operative to initiate said second motor means energization when said shutter means moves to said exposure terminating blocking position.

20. The single lens reflex camera of claim 19 in which said program control means includes means responsive in correspondence with return movement of said operator means into said cocked position for terminating said second motor means energization.

21. The single lens reflex camera of claim 19 in which said program control means is operative to initially actuate said shutter means to move from said unblocking to said blocking position for securing said exposure chamber and is operative to cause said first motor means energization when said shutter means initially reaches said position blocking the passage of scene light into said exposure chamber.

22. The single lens reflex camera of claim 21 in which said program control means includes means responsive in correspondence with the movement of said operator means from said cocked position for terminating said first motor means energization.

23. The single lens reflex camera of claim 22 in which said exposure control means is operative to move said shutter means to said open position when said operator means has returned to said cocked position.

24. The single lens reflex camera of claim 22 in which said program control means is operative to cause said shutter means to remain in said position blocking the passage of scene light to said exposure chamber during the said first and second energizations of said motor means.

25. A photographic camera comprising in combination:
means defining an exposure chamber for retaining photographic material in position for exposure at an exposure plane;
reflex means movable under spring bias from a first position to a second position respectively to convert said camera from a viewing operational mode to an exposure operational mode;
exposure control means for regulating the exposure of said photographic material during said exposure operational mode and for securing said exposure chamber during said operational mode conversion;
motor means actuable to provide a drive output;
mechanical control means coupled in driven relationship with said motor means and responsive to a first actuation thereof to effect said spring biased movement of said reflex means toward said second position, and responsive to a second actuation thereof to move said reflex means toward said first position; and
control means for selectively effecting said first and second actuation of said motor means during a photographic cycle of said camera.

26. The photographic camera of claim 25 wherein said control means is operative to effect said first motor means actuation when said exposure control means has secured said exposure chamber at the commencement of a said photographic cycle, and to effect said second motor means actuation at the termination of a said exposure of said photographic material.

27. The photographic camera of claim 25 in which said control means includes means respondable in correspondence with movement of said reflex means away from said first position for terminating said first motor means actuation.

28. The photographic camera of claim 25 in which said control means includes means respondable in correspondence with movement of said reflex means into said first position for terminating said second motor means actuation.

29. The photographic camera of claim 25 in which:

said mechanical control means includes drive means mechanically restraining said reflex means, against said spring bias when at said first position, and means responsive to said first motor means actuation for releasing said drive means restraint.

30. The photographic camera of claim 29 wherein said control means includes switch means responsive to said drive means release for effecting the termination of said first motor means actuation.

31. The photographic camera of claim 25 in which:
said exposure control means includes shutter means movable at the commencement of a said photographic cycle from an initial open position to a closed position blocking the passage of light therethrough, thence to an open position to initiate a said exposure of said photographic material, thence to a closed position to terminate said exposure, thence to said initial open position at the termination of said cycle; and
said control means is operative to effect said first motor means actuation when said shutter means is at said closed position upon being moved thereto from said initial open position, and is operative to terminate said first actuation in correspondence with said movement of said reflex means away from said first position.

32. The photographic camera of claim 31 wherein said control means is operative to effect said second motor means actuation when said shutter means is at said closed position to terminate a said exposure, and is operative to terminate said motor means actuation when said reflex means has moved from said second position into said first position.

33. The photographic camera of claim 32 wherein said control means includes switch means actuable when said reflex means is moved to a predetermined location closely proximate or at said first position for effecting the said terminations of said motor means actuation.

34. The photographic camera of claim 33 wherein said motor means is present as at least one electrically powered motor actuated by energization thereof.

35. A photographic camera comprising in combination:
instrumentality means actuable to carry out select operational events within an operational cycle of said camera, said cycle including the exposure of photographic material;
processing means driveable to process said photographic material subsequent to each said exposure thereof;
motor means energizeable to drive said processing means and to actuate said instrumentality means to carry out a select one of said events within said operational cycle; and
control means for controlling the carrying out of a photographic cycle including selective energization of said motor means.

36. The photographic camera of claim 35 in which:
said instrumentality means includes exposure control means operative to block an optical path to define a first of said events defining said operational cycle; and
said control means is respondable in correspondence with the completion of said first event to energize said motor means so as to actuate said instrumentality means to carry out said select one of said events.

37. The photographic camera of claim 35 in which:
said instrumentality means includes reflex means actuable to move under spring bias from a first position to a second position to convert said camera from a viewing operational mode to an exposure operational mode; and
said motor means is operative to effect said reflex means actuation when selectively energized by said control means.

38. The photographic camera of claim 37 in which:
said control means is respondable in correspondence with said reflex means movement to de-energize said motor means.

39. The photographic camera of claim 37 in which:
said instrumentality means includes exposure control means operative to block an optical path to define a first of said events defining said operational cycle; and
said control means is respondable in correspondence with the completion of said first event to energize said motor to effect said reflex means actuation.

40. The photographic camera of claim 39 in which:
said control means is respondable in correspondence with said reflex means movement away from said first position to de-energize said motor means.

* * * * *